J. L. CREVELING.
ELECTRIC REGULATION.
APPLICATION FILED NOV. 17, 1911.
1,123,251.
Patented Jan. 5, 1915.
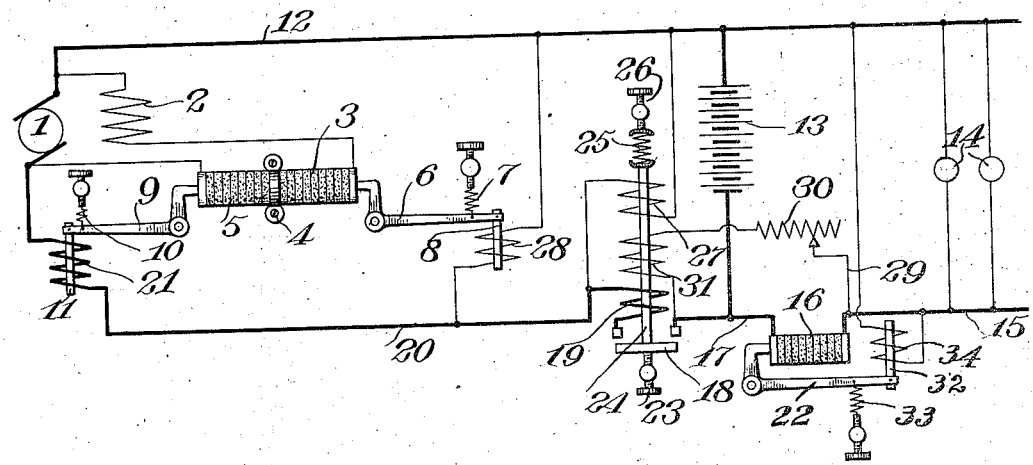
WITNESSES
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,123,251.  Specification of Letters Patent.  Patented Jan. 5, 1915.

Application filed November 17, 1911. Serial No. 660,763.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to regulate a generator in a predetermined manner and has for its particular object to provide means whereby a generator driven at variable speeds will be automatically governed to properly charge a storage battery and supply lamps or other translating devices and my invention provides means whereby the generator will be properly connected with the storage battery and translating devices when its voltage is substantially equal to that of the same and disconnected within a narrow margin of this same voltage regardless of the variations to be met in storage battery voltage in practice.

The drawing is a diagrammatic representation of one type of system embodying the essentials of my invention.

In the drawing, 1 represents a dynamo or generator provided with the usual field coil 2 having the resistances 3 and 5 in series therewith. These resistances are indicated as of the ordinary carbon pile variety mechanically separated and electrically united by a stationary metallic member 4. The resistances 3 and 5 are in series with the field coil 2 and, therefore, either, by proper manipulation, may be used to regulate the voltage of the generator in a well-known manner.

6 is a lever normally drawn in an upward direction as by the adjustable spring 7 in such manner as to tend to compress the carbon pile 3 and lower the resistance thereof. The lever 6 carries at one extremity the core of magnetic material 8 and thus motion imparted to the said core may serve to regulate the generator.

9 is a lever drawn in an upward direction as by the adjustable spring 10 in such manner as to tend to compress the carbon pile 5 and lower its resistance. The lever 9 is provided at one extremity with a core 11 of magnetic material whereby motion imparted to the said core may regulate the generator.

12 represents the positive lead of the generator which is carried from the positive brush thereof to the positive side of the storage battery 13 and lamps or other translating devices 14. The negative terminals of the translating devices are carried to the main 15 connected with one terminal of the translation circuit regulator, in this instance indicated as a carbon pile 16, having its opposite terminal in communication with the wire 17 in electrical communication with the negative side of the storage battery 13 and one of the terminals of the automatic switch controlled by the position of the conducting member 18. The opposite terminal of the said switch is connected through a series coil 19 to the wire 20 which is connected with one end of the solenoid coil 21 surrounding the core 11 in such manner that when energized it tends to draw the same downwardly and increase the resistance 5. The opposite terminal of the solenoid coil 21 is in connection with the negative lead of the generator.

23 is an adjustable screw limiting the motion that can be given to the conducting member 18 in a downward direction and said member is carried by the magnetic core 24 normally pressed downwardly as by the compression spring 25 adjustable as by the screw 26.

27 is a solenoid coil surrounding the core 24 and so arranged that when energized it tends to lift the core against the action of spring 25 and close the circuit between the generator and the battery and translating devices. The coil 19 in series with the generator circuit is so wound with regards the coil 27 that when energized by current flowing from the generator it will assist said coil 27 in holding the switch closed and when traversed by back discharge from the battery through the generator, it will oppose the coil 27 and tend to open the switch.

28 is a solenoid coil in shunt across the generator and so arranged that when energized it tends to draw the core 8 downwardly and increase the resistance 3. From the main 15 the wire 29 is carried to the adjustable resistance 30 which is in communication with one terminal of the solenoid coil 31 surrounding the core 24 of the main switch and having its opposite terminal connected with the wire 17. The solenoid coil 31 is so disposed that when the translation circuit regulator interposes resistance 16 in said circuit so as to cause a drop across the resistance, the current flowing by virtue of this drop through the coil 31 will oppose the magneto-motive force generated by the coil 27. 22 is a lever controlling the resistance 16 and is normally drawn in a downward direction by the adjustable spring 33 in such manner as to tend to decrease the resistance 16. 22 carries at one extremity a core of magnetic material 32 surrounded by the solenoid 34 in shunt across the translation circuit.

The operation of my invention is substantially as follows: Starting with the generator at rest and the main switch open and the storage batteries at the normal voltage or the minimum desired to have impressed across the translation circuit, the resistance 16 will be at the minimum value and substantially zero in an ordinary system and, of course, there will be practically no drop across the resistance 16 and no appreciable current flowing in the coil 31. If now the generator be started and its voltage be brought up to substantially the same voltage as that of the battery, I so adjust the spring 25 that the coil 27 will close the main switch through conducting member 18 and cut the generator into circuit with the storage battery and translating devices across a break of substantially zero difference of potential and, therefore, there will be no sudden rush of current to or from the battery and no back discharge tending to open the switch and no flicker caused upon the lights by the connection of the generator with the circuit. If now, with the batteries at their normal or minimum working voltage, the generator speed be increased until its voltage be sufficient to supply the maximum current desired, I then so adjust the spring 10 that any increase in current above this desired maximum will draw the core 11 downwardly and increase the resistance 5 in such manner as to prevent this maximum desired current from being exceeded throughout increases of generator speed. If now the generator continue to supply current at this rate until the battery voltage has risen, the voltage across the translation circuit will tend to rise and I so adjust the spring 33 that any increase in voltage across the translation circuit will cause the solenoid coil 34 to lift the lever 22 and increase the resistance 16 in such manner as to hold the translation circuit voltage constant. This will, of course, cause a drop across resistance 16 and current will then flow through the solenoid coil 31 and tend to weaken the effect of solenoid coil 27. If the generator continue to charge the battery until its voltage reach the maximum desired to have across the same, I then so adjust the spring 7 that any increase above this voltage will cause the solenoid coil 28 to draw the core 8 downwardly and increase the resistance 3 in such manner as to prevent this voltage from being exceeded. If now the generator slow down and its voltage fall until substantially equal to that of the storage battery with zero current supplied by the generator, I then so adjust the resistance 30 that the current flowing around resistance 16 through the coil 31 will so affect the coil 27 that an extremely small back discharge through the coil 19 will cause the main switch to open and break the connection with the generator circuit and if this voltage remain constant across the battery, the main switch will not close until a slight excess above the opening voltage is reached across the coil 27 and the switch will be closed when the generator voltage is substantially equal to that of the battery regardless of the fact that the battery voltage has risen so as to cause a considerable drop across resistance 16. For example, in practice, in a 60 volt system, if the battery be 60 volts and the resistance 16 be practically *nil* and the voltage upon the translation circuit therefor substantially 60 volts, the main switch may be so arranged that substantially 60 volts across the generator will close the same; then a very slight drop below 60 will cause the switch to open. If, however, the battery voltage be 75 volts, the 15 volts drop across resistance 16 will cause such an effect through the instrumentality of the coil 31 that 75 volts will be required across the coil 27 to close the switch, and a very slight drop below 75 volts on the generator may be caused to open the same, the switch working on a very narrow margin and adjusting itself to open and close at substantially the battery voltage.

I do not wish in any way to limit myself to the exact details of construction nor to the exact mode of operation set forth herein in describing one type of system embodying the elements of my invention, for it will be obvious that wide departure may be made in the way of details without departing from the spirit and scope of my invention which is as set forth in the following claims:

1. The combination with a source of variable electromotive force, a storage battery, a translation circuit and means for regulating the translation circuit, of automatic means for connecting the storage battery with said source affected by the operation of the translation circuit regulator.

2. The combination with a source of variable electromotive force, a storage battery, a translation circuit and means for regulating the translation circuit, of automatic means for connecting the storage battery with said source and means whereby the translation circuit regulator affects the same.

3. The combination with a source of variable electromotive force, a storage battery, a translation circuit and means for regulating the translation circuit, of automatic means for connecting the storage battery with said source and means whereby the difference in potential between the translation circuit and the storage battery affects the same.

4. The combination with a generator, a main circuit, a storage battery and a translation circuit, of means for controlling the main circuit affected by the difference of potential between the translation circuit and the storage battery.

5. The combination with a generator and a supply circuit, a storage battery, a translation circuit and means for regulating the translation circuit, of means for manipulating the supply circuit affected by the operation of the translation circuit regulator.

6. The combination with a generator, a storage battery and a translation circuit, of means for regulating the translation circuit, means for controlling the connection of the generator with the storage battery and translation circuit and means for affecting said controlling means affected by the translation circuit regulator.

7. The combination with a generator, a storage battery and a translation circuit, of means for regulating the translation circuit, means for controlling the connection of the generator with the storage battery and translation circuit and means for affecting said controlling means affected in accordance with the drop in potential across the translation circuit regulator.

8. The combination with a generator, a storage battery and a translation circuit, of means for regulating the translation circuit, means for controlling the connection of the generator with the storage battery and translation circuit and means for affecting said controlling means affected by voltage variation caused by the translation circuit regulator.

9. The combination with a generator, a main circuit, a storage battery, a translation circuit, a regulator for the translation circuit responsive to voltage fluctuations, a regulator for the generator permitting certain voltage variations in the regulation of the same and means for controlling the connection between the generator and the storage battery effected by the generator voltage and by the translation circuit regulator.

10. The combination with a generator, a main circuit, a storage battery, a translation circuit, a regulator for the translation circuit responsive to voltage fluctuations, a regulator for the generator permitting certain voltage variation in the regulation of the same and means for controlling the connection between the generator and the storage battery affected by the difference in potential between the storage battery and the translation circuit.

11. In an automatic system of electric regulation comprehending a generator and regulator therefor, a storage battery, a translation circuit, a regulator therefor and a main switch adapted to automatically control the connection of the generator with the storage battery and translation circuit and means for affecting the operation of said switch affected by the translation circuit regulator.

12. In an automatic system of electric regulation comprehending a generator and regulator therefor, a storage battery, a translation circuit, a regulator therefor and a main switch adapted to automatically control the connection of the generator with the storage battery and translation circuit and means for affecting the operation of said switch affected by the difference in potential between the storage battery and the translation circuit.

13. The combination with a source of electromotive force, a storage battery, a translation circuit and automatic means for connecting the storage battery and translation circuit with said source, of means for regulating the translation circuit voltage and affecting the operation of said connecting means.

14. The combination with a source of electromotive force, a storage battery, a translation circuit and automatic means for connecting the storage battery and translation circuit with said source, of means for regulating the translation circuit and means whereby the same affects the said connecting means.

JOHN L. CREVELING.

Witnesses:
ANNA M. WALL,
M. HERSKOVITZ.